(12) United States Patent
McIntosh

(10) Patent No.: US 9,440,316 B2
(45) Date of Patent: Sep. 13, 2016

(54) CIRCULAR GALLEY DRAIN STRAINER

(71) Applicant: The Boeing Company, Seal Beach, CA (US)

(72) Inventor: Darren Carl McIntosh, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 210 days.

(21) Appl. No.: 14/231,695

(22) Filed: Mar. 31, 2014

(65) Prior Publication Data
US 2015/0275488 A1 Oct. 1, 2015

(51) Int. Cl.
| | | |
|---|---|---|
| *E03C 1/264* | (2006.01) | |
| *A47K 1/14* | (2006.01) | |
| *B01D 35/153* | (2006.01) | |
| *B01D 24/00* | (2006.01) | |
| *B01D 35/00* | (2006.01) | |
| *B23P 6/00* | (2006.01) | |
| *B63B 29/22* | (2006.01) | |
| *B64D 11/04* | (2006.01) | |
| *B63B 29/16* | (2006.01) | |

(52) U.S. Cl.
CPC ............... *B23P 6/00* (2013.01); *B63B 29/22* (2013.01); *B64D 11/04* (2013.01); *E03C 1/264* (2013.01); *B63B 29/16* (2013.01); *Y10T 29/49723* (2015.01)

(58) Field of Classification Search
CPC ............ B63B 29/22; B63P 6/00; E03C 1/26; B01D 35/02

USPC .............. 4/286–295, 652; 210/153, 447, 498
See application file for complete search history.

(56) References Cited

U.S. PATENT DOCUMENTS

| | | | | |
|---|---|---|---|---|
| 3,179,253 A | * | 4/1965 | McNeal ................ | B01D 29/33 |
| | | | | 210/315 |
| 3,839,176 A | | 10/1974 | McCoy et al. | |
| 5,413,705 A | * | 5/1995 | Tammera et al. .... | B01D 21/265 |
| | | | | 210/163 |
| 5,800,702 A | * | 9/1998 | Taylor-McCune et al. ..................... | B01D 29/05 |
| | | | | 210/162 |
| 6,859,950 B2 | | 3/2005 | Rood | |
| 2015/0136678 A1 | * | 5/2015 | Lopez .................. | E04H 4/1209 |
| | | | | 210/237 |

* cited by examiner

*Primary Examiner* — Christine Skubinna
(74) *Attorney, Agent, or Firm* — Parsons Behle & Latimer

(57) ABSTRACT

A drain strainer assembly includes a housing having a circular cross-section, with an inlet port, an outlet port, and a plurality of first engagement tabs. The drain strainer assembly also includes a strainer member assembly having a circular cross-section. The strainer member assembly includes a strainer member with a solid front surface having a handle and a plurality of second engagement tabs interlocked with the first engagement tabs on the housing. The strainer member also includes cylindrical strainer sidewalls defining a circular opening at the back of the strainer member, and has an upper conduit aligned with the inlet port of the housing. The strainer member assembly also includes a circular strainer disk coupled to the strainer member with a fastener and covering the circular opening at the back of the strainer member.

16 Claims, 8 Drawing Sheets

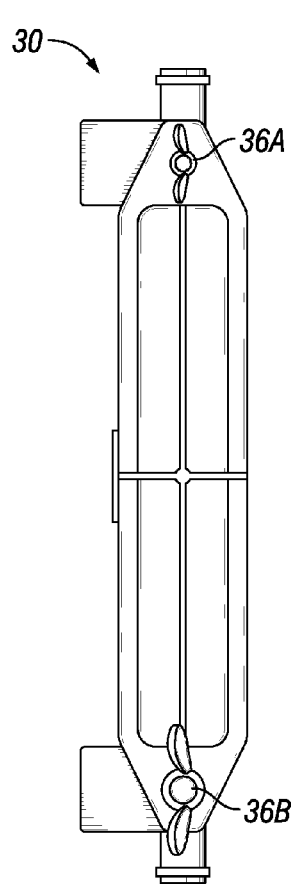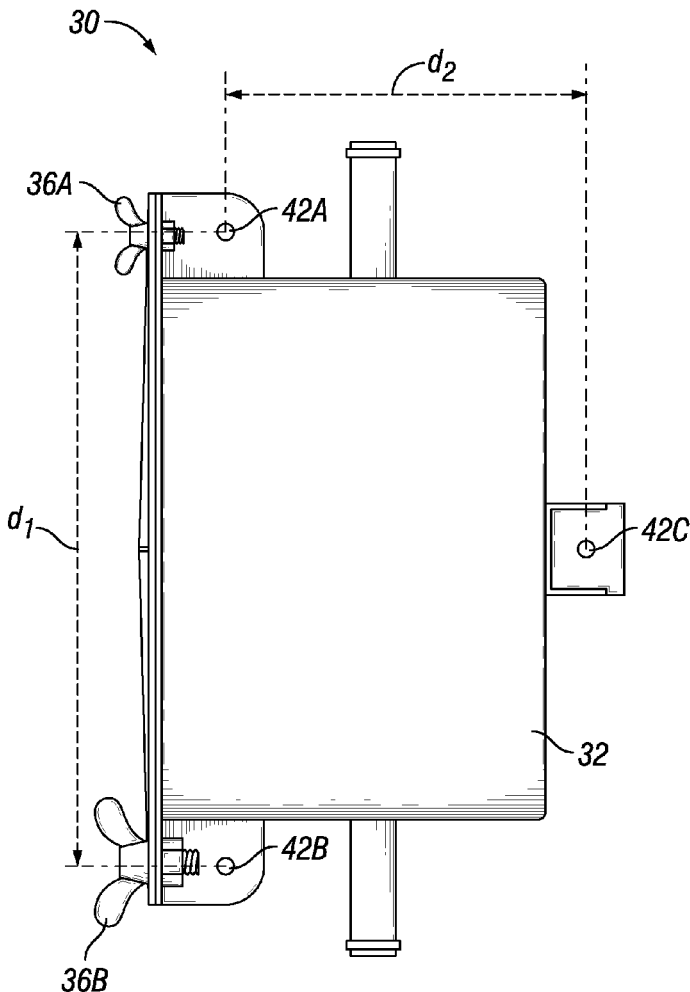
FIG. 2A
(Prior Art)
FIG. 2B
(Prior Art)

CIRCULAR GALLEY DRAIN STRAINER

FIELD OF THE DISCLOSURE

The present disclosure relates generally to drain strainer assemblies and, more specifically, to drain strainer assemblies of the type used, for example, in vehicles such as commercial aircraft, trains, ships, and other applications.

BACKGROUND

Drain strainers may be found in virtually any environment where food and beverages are served. Many passenger vehicles, for example, aircraft, trains, and ships, are equipped to serve food and beverages to the passengers. To facilitate such services, the vehicle may be equipped with a galley in which the food and beverages are handled. The galley may be equipped with a catch basin (or sink) to allow convenient disposal of waste fluids. An important consideration in the operation of such food and beverage services is the continued operation and successful maintenance of the plumbing associated with the catch basin, as well as attention to environmental or waste processing concerns (e.g., not dumping solid waste from a moving vehicle). Thus, the plumbing may be equipped with a removable drain strainer that strains debris and particulates from the waste fluids, thereby preventing clogs and other associated plumbing problems.

FIG. 1 illustrates a perspective view of a galley 10 in accordance with the prior art. The galley 10 includes a counter surface 12 having a catch basin (or sink) 14 disposed therein. The catch basin 14 is coupled to a first conduit 16 coupled to a support wall 18. A drain strainer assembly 30 is attached to the support wall 18 and is fluidly coupled to the first conduit 16. A second conduit 20 is fluidly coupled to the drain strainer assembly 30 and leads away from the drain strainer assembly 30 to, for example, a holding tank (not shown).

FIGS. 2A-2C illustrate additional, enlarged views of the prior art drain strainer assembly 30 of FIG. 1. As shown in FIGS. 1 and 2, the drain strainer assembly 30 includes a housing 32 coupled to the support wall 18 by a plurality fasteners (not shown) inserted through a corresponding plurality of mounting holes 42A-C. Two left mounting holes 42A-B are aligned vertically and separated by a first distance, $d_1$, and a right mounting hole 42C is laterally offset from the two left mounting holes 42A-B by a second distance, $d_2$. A strainer member (or basket) 34 is removeably inserted into the housing 32 and secured by a pair of wing screws/bolts 36A-B. An elongated o-ring 38 provides a seal between the housing 32 and the strainer member 34.

In operation, waste liquids dumped into the catch basin 14 flow through the first conduit 16 and pass through the strainer member 34 of the drain strainer assembly 30, where the strainer member 34 captures relatively large debris and particulate matter from the waste fluid. The resulting strained fluid then passes out of the drain strainer assembly 30 through the second conduit 20. For cleaning and maintenance of the drain strainer assembly 30, the strainer member 34 may be withdrawn from the housing 32 by loosening the wing screws/bolts 36A-B and pulling the strainer member 34 in a lateral direction indicated by arrows 40. The strainer member 34 may then be inverted over a waste receptacle to discard the debris and particulate matter through an opening at the top of the basket, then washed and rinsed. Once the strainer member 34 has been emptied and cleaned, it can be inserted again into the housing 32 and secured by tightening the wing screws/bolts 36A-B. As shown in FIG. 2, the top wing screw/bolt 36A is smaller than the bottom wing screw/bolt 36B to prevent a crew member or other user from erroneously inserting the strainer member 34 into the housing 32 upside down.

Drain strainer assemblies 30 of the type shown in FIGS. 1 and 2 are widely-known and commercially-available. Desirable results have been achieved using the prior art drain strainer assembly 30. However, improvements may be possible.

For example, the drain strainer assembly 30 involves a substantial number of components, including the housing 32, strainer member 34, wing screws/bolts 36A-B, and o-ring 38. Some of these components, especially the wing screws/bolts 36A-B, can be misplaced during use, which may render the entire drain strainer assembly 30 inoperable until one or more suitable replacement components can be obtained. Therefore, it may be desirable to reduce the number of components associated with the drain strainer assembly 30 to minimize down time due to lost parts.

In addition, the prior art drain strainer assembly 30 frequently begins leaking after an extended period of use. When such leaking occurs, crew members or other users have a tendency to over-tighten the wing screws/bolts 36A-B in an effort to prevent further leaking However, due to the elongated geometry of the strainer member 34 and the o-ring 38, such over-tightening actually causes the middle of the strainer member 34 to flex away from the housing 32, which compromises the seal between the strainer member 34 and the housing 32. As a result, over-tightening the wing screws/bolts 36A-B frequently causes undesired additional leaking.

In addition, because the cleaning and maintenance of the drain strainer assembly 30 requires the withdrawal of the strainer member 34 from the housing 32 in the lateral direction 40, it can be difficult for crew members or other users to gain access to the strainer member 34 while working in the limited space typically available in the galley 10. Furthermore, a sufficient area must be reserved on the support wall 18 to accommodate the withdrawal of the strainer member 34 from the housing 32. This area, referred to as the "extraction envelope" of the drain strainer assembly 30, requires a lateral dimension, $d_3$, of approximately twice the width of the housing 32. The area required by the extraction envelope of the drain strainer assembly 30 is not available for any other components or structures. Thus, the lateral withdrawal of the strainer member 34 from the housing 32 may impose undesirable constraints on the overall design of the galley 10, where space is often at a premium. Accordingly, it may also be desirable to simplify the procedures involved in cleaning and maintaining the drain strainer assembly 30.

SUMMARY

The present application is directed to drain strainer assemblies, and to systems and methods for installing and maintaining drain strainer assemblies. Systems and methods in accordance with the present application may advantageously provide substantial improvements over the prior art, including decreasing the number of components required, improving the efficiency of routine maintenance operations, improving the strainer performance and increasing its volume, decreasing the overall weight and cost of the strainer, and providing improved utilization of space within the vehicle.

In one example, a drain strainer assembly comprises a housing having a circular cross-section, the housing comprising an inlet port, an outlet port, and a plurality of first engagement tabs; and a strainer member assembly having a circular cross-section. The strainer member assembly comprises a strainer member with a solid front surface having a handle and a plurality of second engagement tabs interlocked with the first engagement tabs on the housing, the strainer member further comprising cylindrical strainer sidewalls defining a circular opening at the back of the strainer member and having an upper conduit aligned with the inlet port of the housing. The strainer member assembly further comprises a circular strainer disk coupled to the strainer member with a fastener and covering the circular opening at the back of the strainer member.

The housing may further comprise a plurality of primary mounting holes through which fasteners may be inserted to secure the housing to a structure. The housing may also further comprise an optional secondary mounting hole. The primary mounting holes and secondary mounting holes may be configured to enable a retrofit installation of the drain strainer assembly. The strainer member assembly may further comprise a sealing member, which may comprise a circular o-ring located within a corresponding groove in the cylindrical strainer sidewalls of the strainer member. The drain strainer assembly may further comprise a label on the handle of the strainer member, the label indicating the correct orientation of the strainer member assembly within the housing. The fastener may comprise an attachment pin or a hinge mechanism.

In another example, a vehicle galley comprises a counter surface having a catch basin disposed therein, the catch basin being fluidly coupled to a first conduit attached to a support wall, a circular drain strainer assembly attached to the support wall, and a second conduit attached to the support wall. The circular drain strainer assembly comprises a housing having a circular cross-section, the housing comprising an inlet port fluidly coupled to the first conduit, an outlet port fluidly coupled to the second conduit, and a plurality of first engagement tabs; and a strainer member assembly having a circular cross-section. The strainer member assembly comprises a strainer member with a solid front surface having a handle and a plurality of second engagement tabs interlocked with the first engagement tabs on the housing, the strainer member further comprising cylindrical strainer sidewalls defining a circular opening at the back of the strainer member and having an upper conduit aligned with the inlet port of the housing. The strainer member assembly further comprises a circular strainer disk coupled to the strainer member with a fastener and covering the circular opening at the back of the strainer member.

The vehicle may comprise an aircraft, a train or a ship. The strainer member assembly may further comprise a sealing member, which may comprise a circular o-ring located within a corresponding groove in the cylindrical strainer sidewalls of the strainer member. The fastener may comprise an attachment pin or a hinge mechanism.

In another example, a method is provided of removing debris from a drain strainer assembly having a circular housing and a circular strainer member assembly. The method comprises rotating a handle of the strainer member assembly to disengage a first plurality of engagement tabs on the strainer member assembly from a second plurality of complementary engagement tabs on the housing, and removing the strainer member assembly from an opening in front of the housing. The method further comprises moving a strainer disk on the strainer member assembly to reveal a circular opening at the back of the strainer member assembly and discarding debris through the circular opening at the back of the strainer member assembly.

The method may further comprise washing and rinsing the strainer member assembly. Moving the strainer disk may comprise: (a) rotating the strainer disk around an attachment pin, or (b) opening a hinge mechanism. The method may further comprise inserting the strainer member assembly into the opening in the front of the housing and securing the strainer member assembly in the housing by rotating the handle of the strainer member assembly.

BRIEF DESCRIPTION OF THE DRAWINGS

FIGS. 2A-C illustrate additional, enlarged views of the prior art drain strainer assembly of FIG. 1.

Like reference numbers and designations in the various drawings indicate like elements.

DETAILED DESCRIPTION

The present application relates to drain strainer assemblies, and to systems and methods for installing and maintaining drain strainer assemblies. Many specific details of certain examples are set forth in the following description and in FIGS. 3-7 to provide a thorough understanding of such examples. One skilled in the art, however, will understand that the systems and methods described in the present application may have additional or alternative elements, or may be practiced without several of the details described in the following description.

Figure 1:
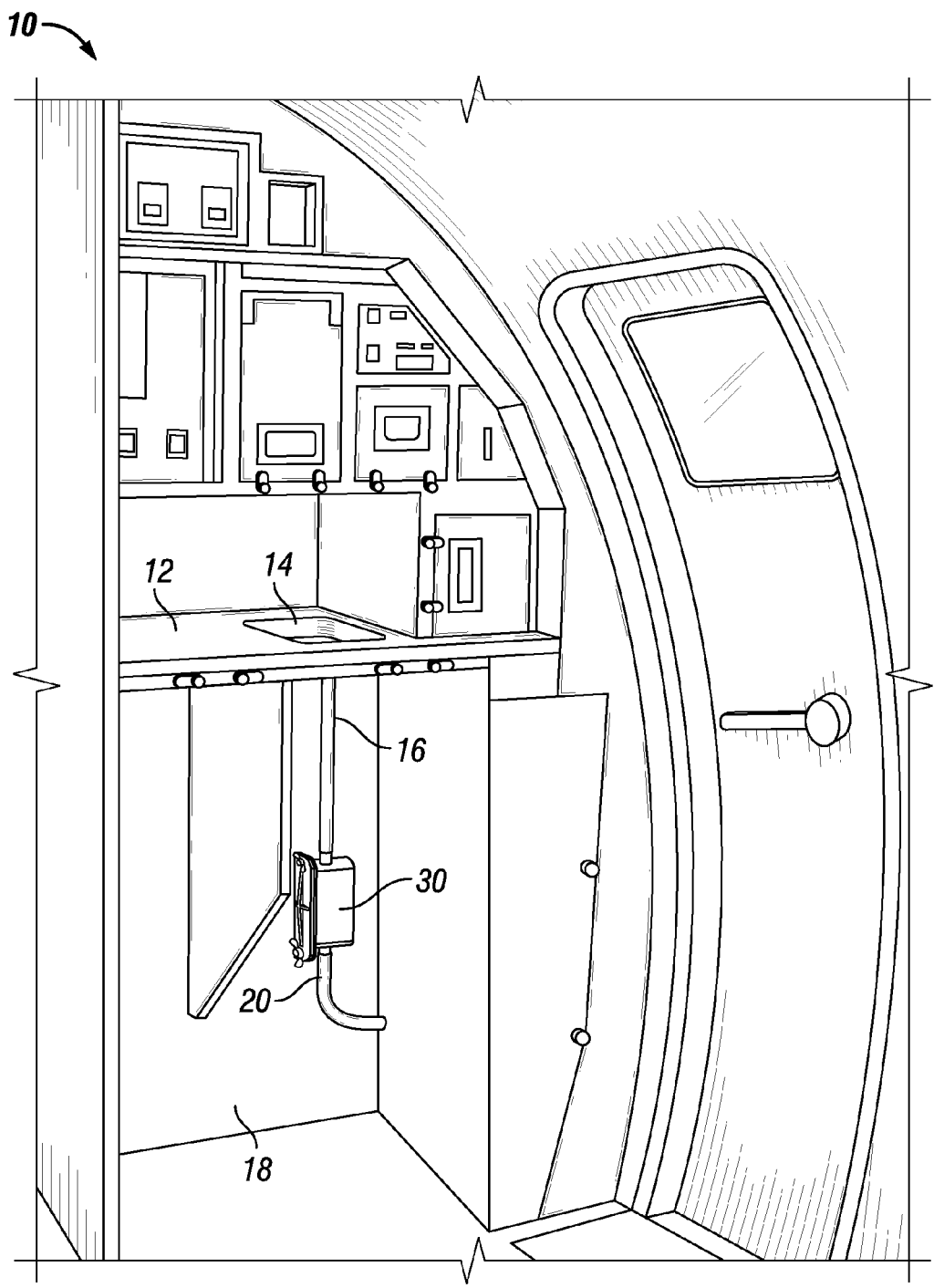
FIG. 1 illustrates a perspective view of a galley having a drain strainer assembly in accordance with the prior art.
Figure 3:
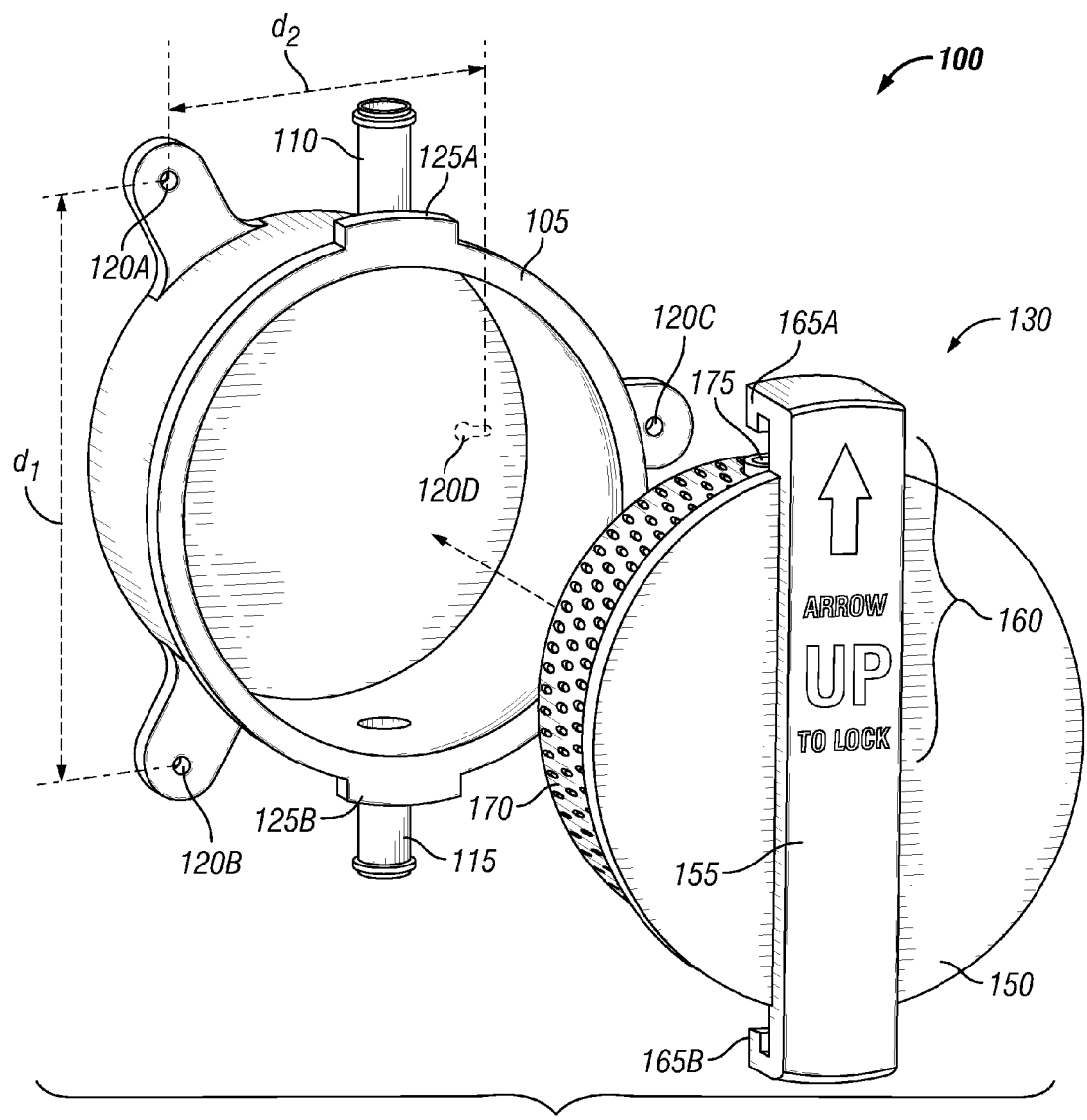
FIG. 3 illustrates a perspective view of one example of an improved drain strainer assembly in accordance with the present application.
Figure 4:
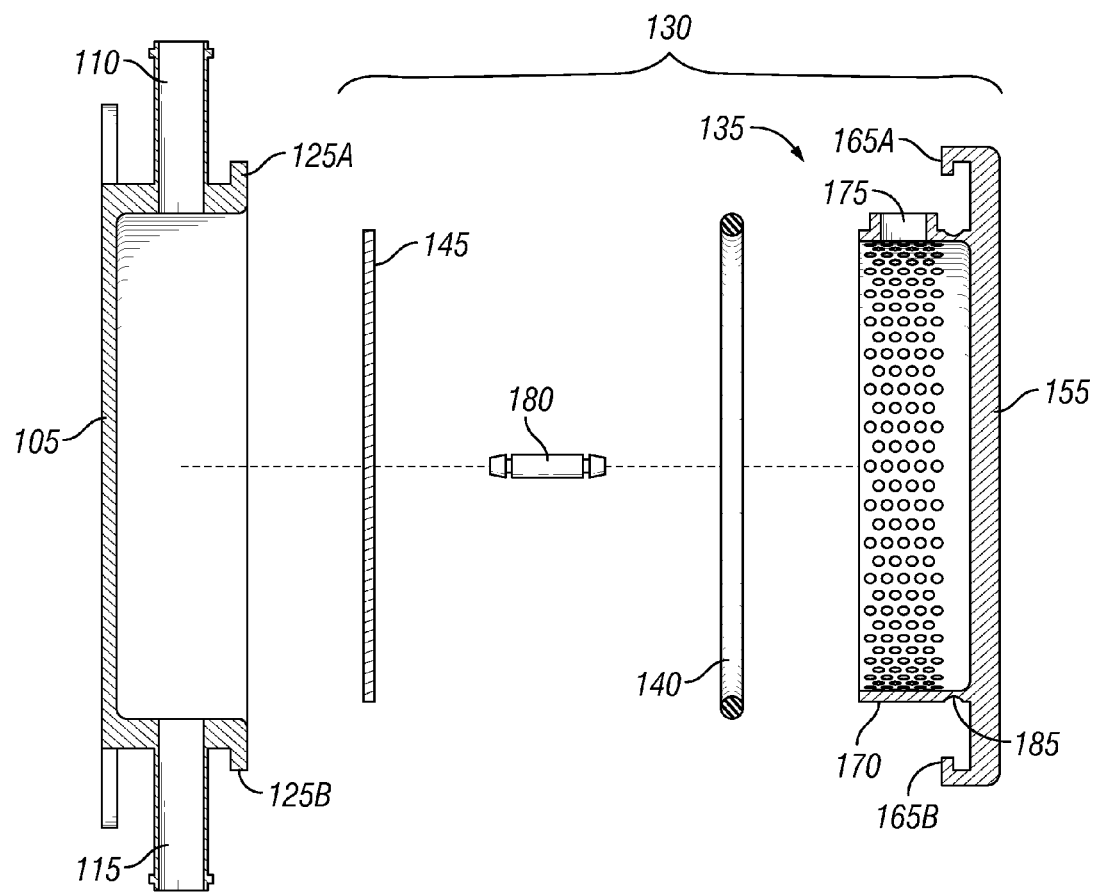
FIG. 4 illustrates an exploded cross-sectional view of the improved drain strainer assembly of FIG. 3.
Figure 5A:
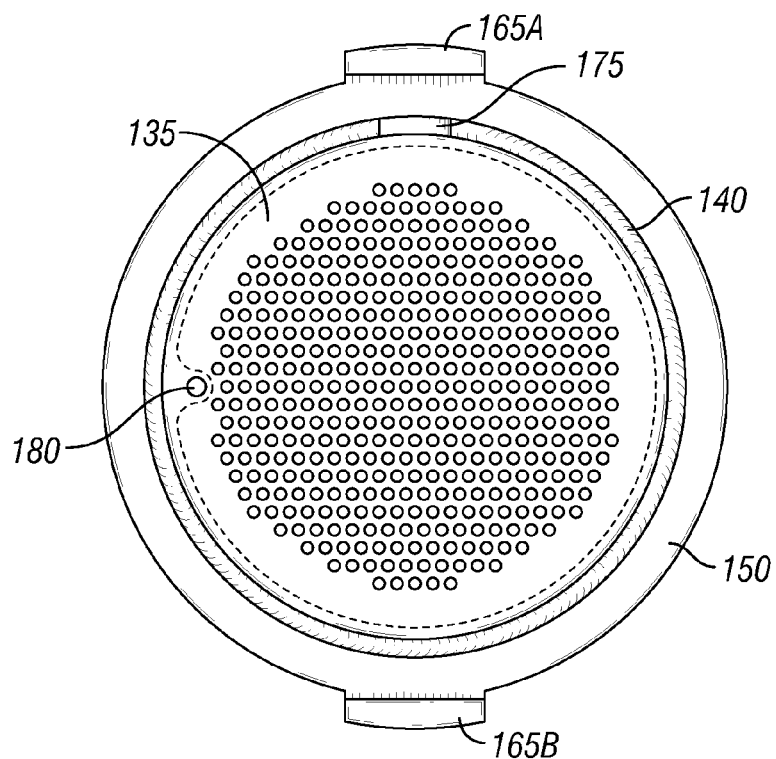
FIGS. 5A-B illustrate rear views of one example of an improved strainer member assembly in accordance with the present application.
Figure 5B:
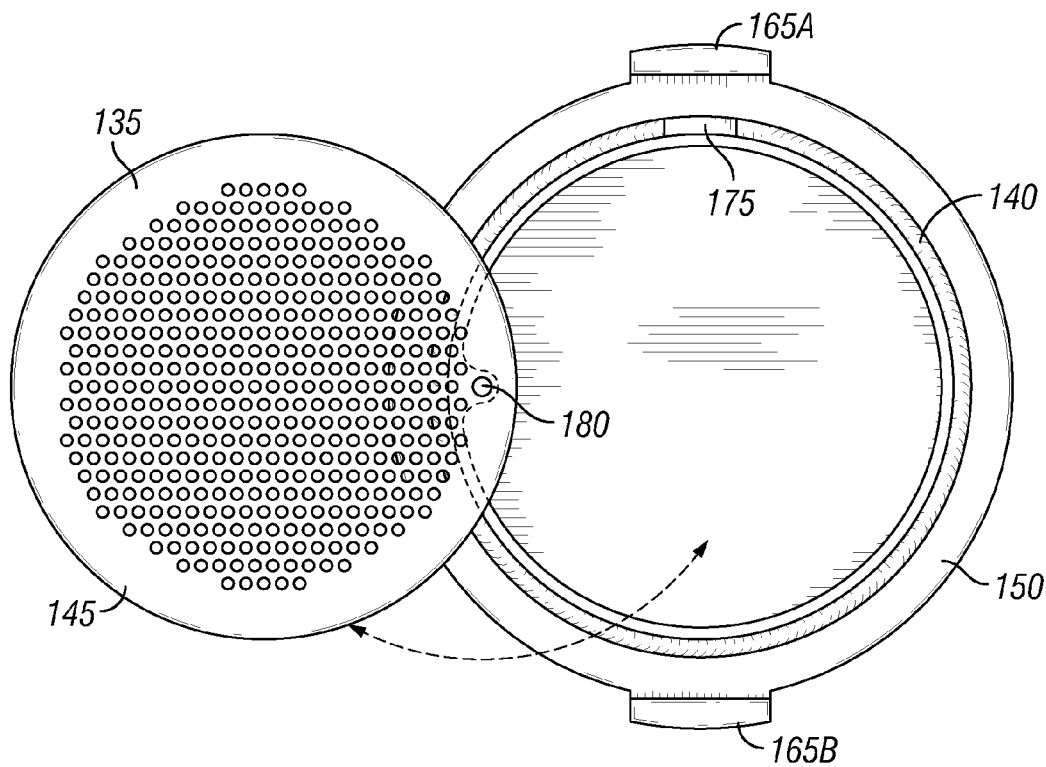
Figure 6A:
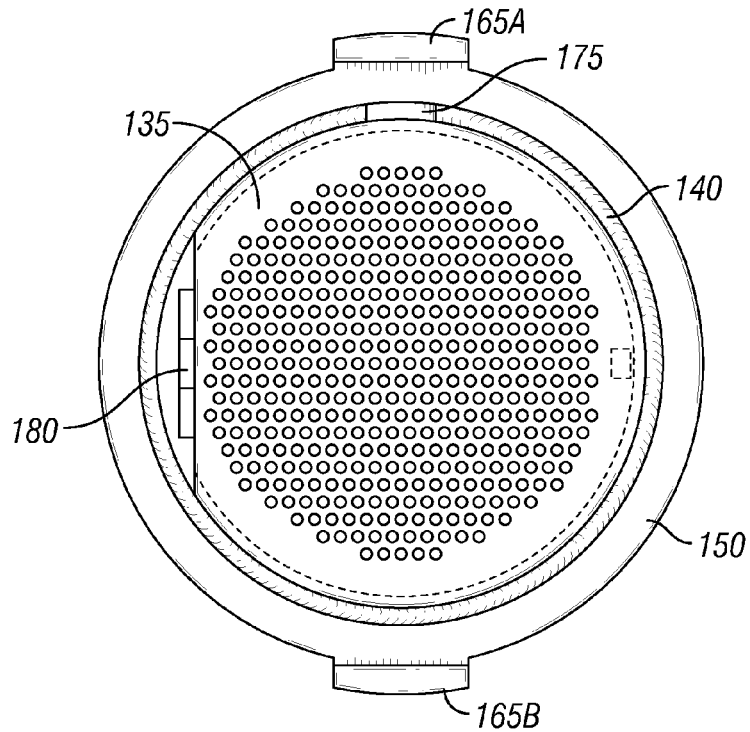
FIGS. 6A-B illustrate rear views of another example of an improved strainer member assembly in accordance with the present application.
Figure 6B:
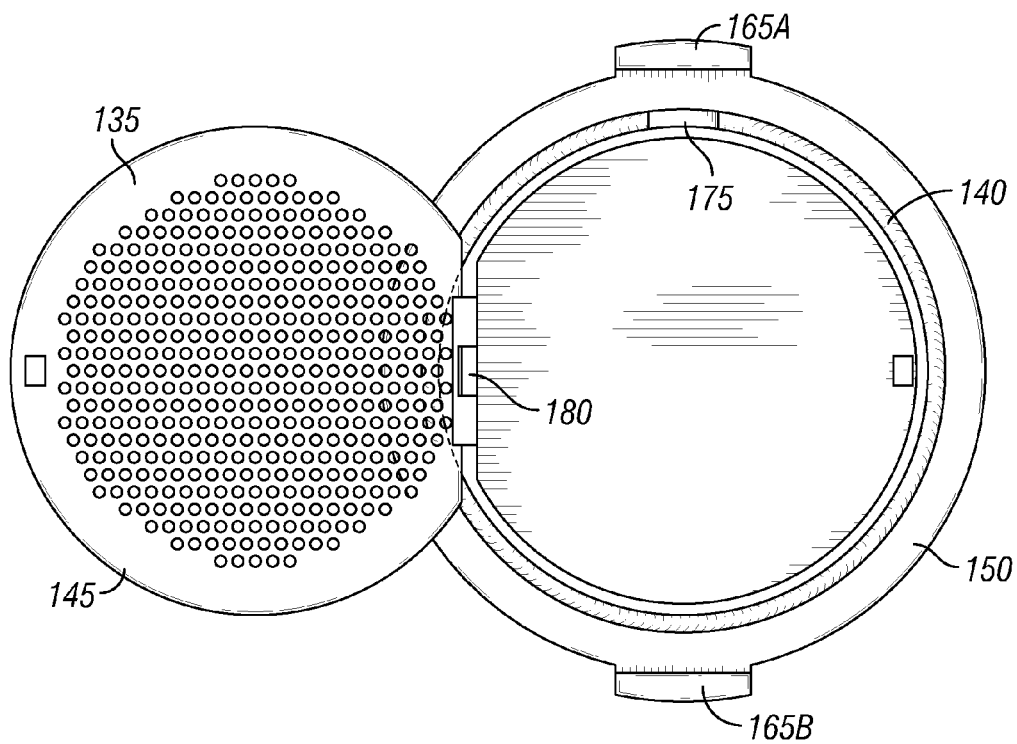

FIG. 3 illustrates a perspective view and FIG. 4 illustrates an exploded cross-sectional view of one example of an improved drain strainer assembly 100 in accordance with the present application. The components of the improved drain strainer assembly 100, described below, can be manufactured out of a wide variety of suitable corrosion resistant material(s). In the illustrated example, the drain strainer assembly 100 comprises a housing 105 having an inlet 110 and an outlet 115. The housing 105 preferably has a generally circular cross-section. The housing 105 also includes a plurality of primary mounting holes 120A-C and an optional secondary mounting hole 120D through which suitable fasteners may be inserted to secure the housing 105 to a structure, such as the support wall 18 of a galley 10, as shown in FIG. 1. In some cases, the optional secondary mounting hole 120D may be configured as a key slot. The housing 105 also includes a plurality of engagement tabs 125A-B.

Figure 2C:
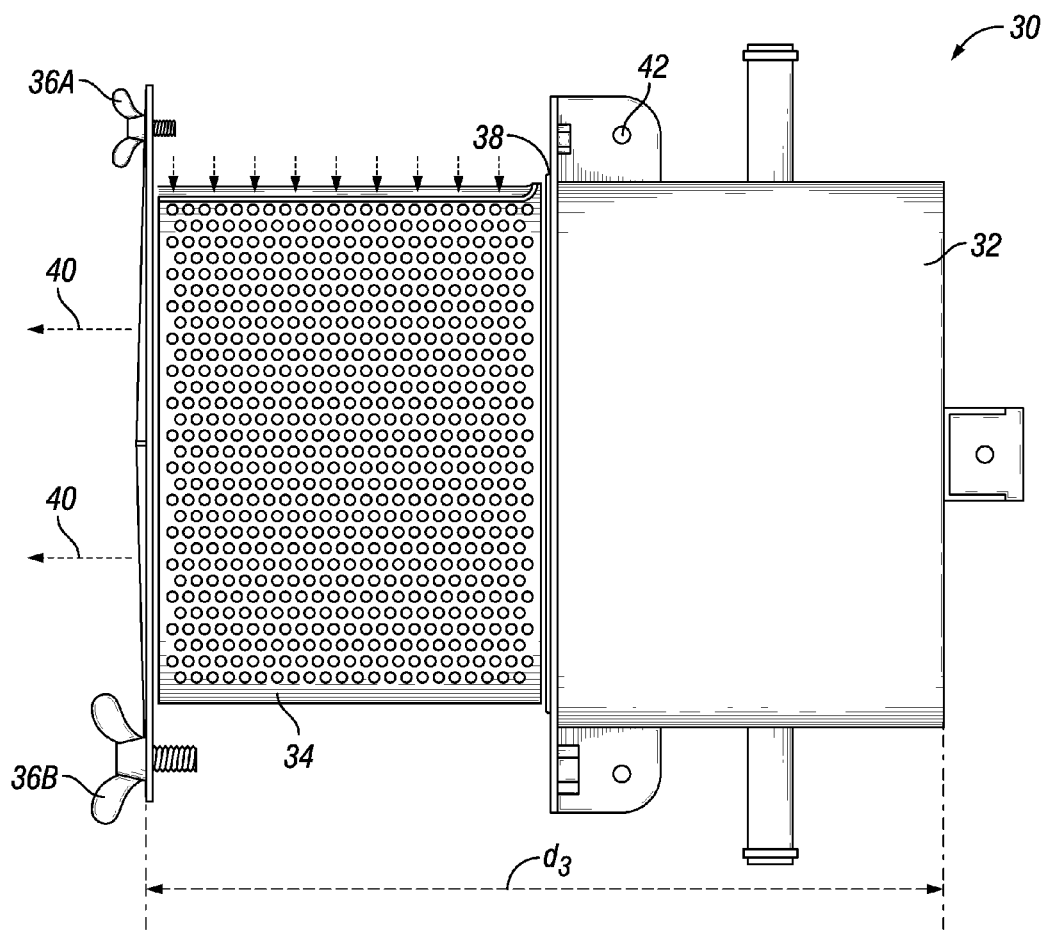

In the example shown in FIGS. 3 and 4, the two left primary mounting holes 120A-B are aligned vertically and separated by a first distance, $d_1$, which may be substantially the same as the distance between the two left mounting holes 42A-B of the prior art housing 32 shown in FIGS. 1 and 2. The optional secondary mounting hole 120D is laterally offset from the two left mounting holes 120A-B by a second distance, $d_2$, which may be substantially the same as the lateral offset distance between the mounting holes 42A-C of the prior art housing 32 shown in FIGS. 1 and 2. This configuration advantageously enables the improved drain strainer assembly 100 to replace a prior art drain strainer assembly 30 quickly and easily as a retrofit in an existing galley 10, if desired, using the same attachment points to secure the new drain strainer assembly 100 to the support wall 18. For retrofit installations, the mounting tab surrounding mounting hole 120C may be completely removed, to allow the improved drain strainer assembly 100 to match the mounting space footprint of the prior art drain strainer assembly 30 on the support wall 18. In new installations that are not retrofits, the improved drain strainer assembly 100 is preferably attached to a structure using the primary mounting holes 120A-C.

The drain strainer assembly 100 also includes an improved strainer member assembly 130 comprising a strainer member 135, a sealing member 140, a strainer disk 145, and a fastener 180. In the example shown in FIGS. 3 and 4, the strainer member 135 has a solid front surface 150 with a handle 155 having a label 160 indicating the correct orientation of the strainer member assembly 130 within the housing 105. The solid front surface 150 may comprise any suitable material that is impermeable. The strainer member 135 also includes a plurality of engagement tabs 165A-B configured to mate with the engagement tabs 125A-B of the housing 105. In some cases, the strainer member engagement tabs 165A-B and housing engagement tabs 125A-B are arranged in a radially symmetric pattern. Those of ordinary skill in the art will understand that the interface between between the strainer member 135 and the housing 105 may comprise a wide variety of additional or alternative fluid-tight connections, such as, for example, a threaded connection.

In addition, the strainer member 135 includes cylindrical strainer sidewalls 170 with an upper conduit 175 configured to align with the inlet 110 of the housing 105 when the strainer member assembly 130 is inserted into the housing 105. When the strainer member assembly 130 is fully assembled, the strainer disk 145 is attached to the strainer member 135 with a suitable fastener 180, such as the attachment pin shown in FIG. 4, to cover the circular opening at the back of the strainer member 135 defined by the cylindrical strainer sidewalls 170. In the illustrated example, the sealing member 140 comprises a circular o-ring located within a corresponding groove 185 in the cylindrical strainer sidewalls 170 of the strainer member 135.

Figure 7:
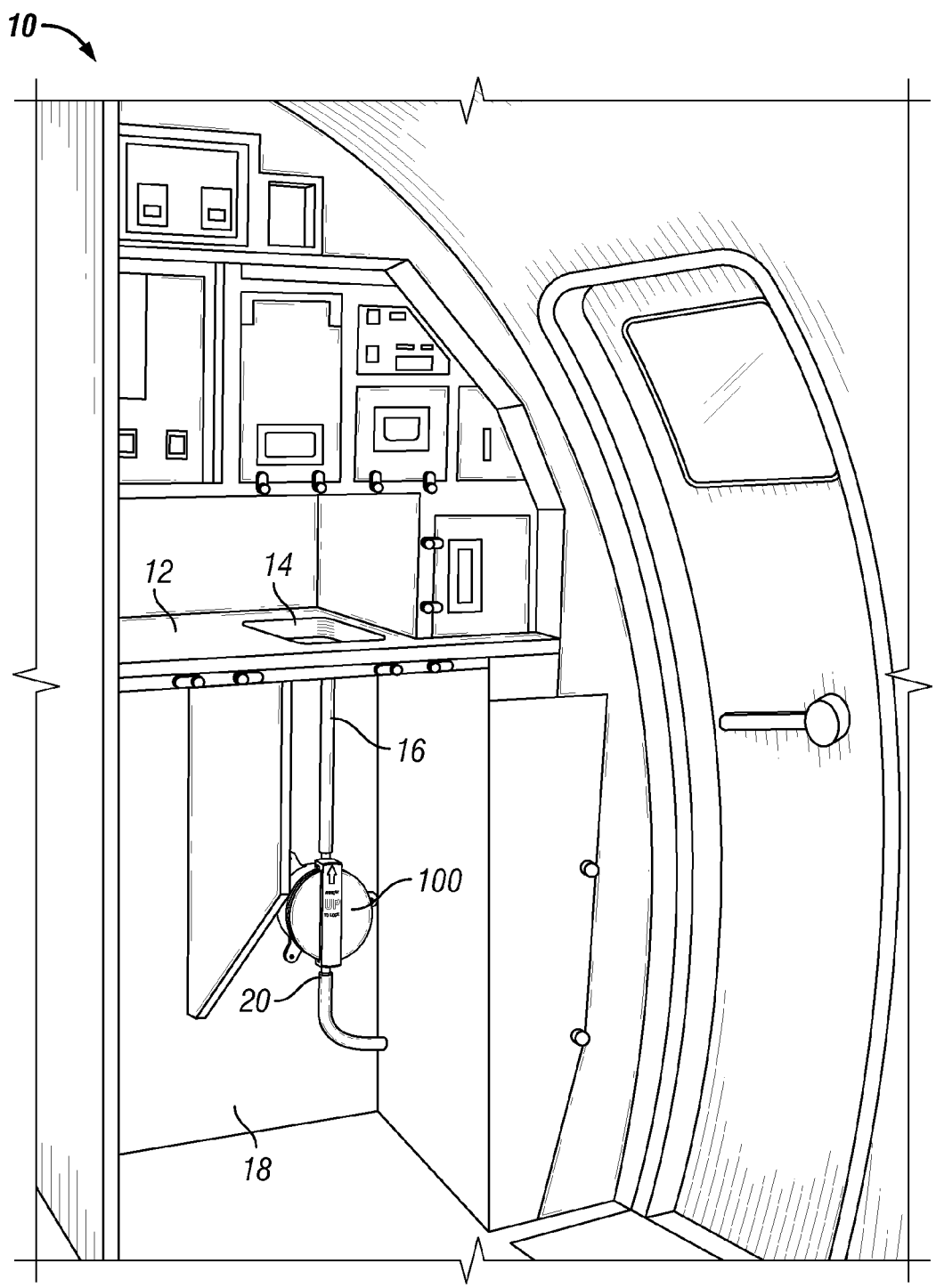
FIG. 7 illustrates a perspective view of a galley having an improved drain strainer assembly in accordance with the present application.

In operation, as shown in FIG. 7, the improved drain strainer assembly 100 can be installed in a galley 10 of a vehicle, such as an aircraft. In the example shown in FIG. 7, the galley 10 comprises a counter surface 12 having a catch basin (or sink) 14 disposed therein. The catch basin 14 is coupled to a first conduit 16 coupled to a support wall 18. The drain strainer assembly 100 is attached to the support wall 18, and the inlet 110 is fluidly coupled to the first conduit 16. The outlet 115 of the drain strainer assembly 100 is fluidly coupled to a second conduit 20, which leads away from the drain strainer assembly 100 to, for example, a holding tank (not shown).

During use, as shown in FIGS. 3-7, the strainer member assembly 130 can be inserted into the housing 105 and secured easily by turning the handle 155 such that the engagement tabs 165A-B of the strainer member assembly 130 interlock with the engagement tabs 125A-B of the housing 105, in the orientation indicated by the label 160. In this configuration, the upper conduit 175 of the strainer member assembly 130 is aligned with the inlet 110 of the housing 105, and the sealing member 140 provides a fluid-tight seal between the strainer member assembly 130 and the housing 105. Waste liquids may then flow through the first conduit 16 into the drain strainer assembly 100 through the inlet 110 and the upper conduit 175, and the strainer member assembly 130 may capture relatively large debris and particulate matter from the waste fluid. The resulting strained fluid may then flow out of the drain strainer assembly 100 through the outlet 115 of the housing 105 into the second conduit 20.

For cleaning and maintenance of the drain strainer assembly 100, the strainer member assembly 130 may be withdrawn from the housing 105 simply by turning the handle 155 to disengage the engagement tabs 165A-B of the strainer member assembly 130 from the engagement tabs 125A-B of the housing 105. The debris and particulate matter may be emptied from the strainer member assembly 130 by moving the strainer disk 145 temporarily to allow the debris and particulate matter to escape from the circular opening at the back of the strainer member 135, as shown in FIGS. 5A-B and 6A-B. In the example shown in FIGS. 5A-B, the fastener 180 comprises an attachment pin, and the strainer disk 145 is moved by rotating it around the attachment pin. In the example shown in FIGS. 6A-B, the fastener 180 comprises a hinge mechanism, and the strainer disk 145 is moved by opening the hinge mechanism. Those of ordinary skill in the art will understand that the strainer disk 145 may be secured to the strainer member 135 using a wide variety of other suitable fasteners 180, which may dictate the manner in which the strainer disk 145 is moved.

Once the strainer member assembly 130 has been emptied, washed and rinsed, the strainer disk 145 can be moved back to its original position, and the strainer member assembly 130 can be inserted again into the housing 105 and secured by rotating the handle 155, as described above. In some cases, the engagement tabs 125A-B of the housing 105 are configured such that they will interlock with the engagement tabs 165A-B of the strainer member assembly 130 in only one orientation, to prevent a crew member or other user from erroneously inserting the strainer member assembly 130 into the housing 105 upside down.

The drain strainer assembly 100 may provide substantial advantages over the prior art. For example, the number of components associated with drain strainer assembly 100 may be reduced in comparison with the prior art drain strainer assembly 30 described above. This reduction in part count is made possible, in part, by the interlocking engagement tabs 125A-B and 165A-B, which perform the function previously performed by the wing screws/bolts 36A-B. As shown in FIGS. 3-4, because the engagement tabs 125A-B, 165A-B form an integral part of the housing 105 and the strainer member assembly 130, respectively, the drain strainer assembly 100 advantageously eliminates the need for additional fasteners, such as the wing screws/bolts 36A-B, which can be misplaced easily.

In addition, the drain strainer assembly 100 exhibits reduced leaking over time, when compared with the prior art drain strainer assembly 30. Because the interface between the housing 105 and strainer member assembly 130 is generally circular and radially symmetrical, the sealing member 140 provides a substantially uniform seal with substantially uniform pressure around the entire circumference of the interface. As a result, the strainer member assembly 135 can be tightened effectively (e.g., to remedy a leak), whereas with the prior art drain strainer assembly 30, additional tightening only exacerbates the leak due to bending of the components and the lack of radial symmetry. Also, by eliminating the wing screws/bolts 36A-B, crew members and other users cannot over-tighten the strainer member assembly 130 on the housing 105. The sealing member 140 can also be replaced easily when it wears out, to extend the life of the drain strainer assembly 100 and reduce overall operational costs.

Another advantage of the drain strainer assembly 100 is that the primary wearing part, the sealing member 140, is located on the strainer member assembly 130. Since the strainer member assembly 130 is easily removed, this facilitates an easy replacement of either the sealing member 140, or an entire replacement of the strainer member assembly 130 without the use of any tools. This process can be performed without any downtime on the aircraft or other vehicle. This is a substantial advantage over the prior art drain strainer assembly 30, which has an elongated o-ring 38 semi-permanently installed on the housing 32, which is mechanically attached to the support wall 18, the upper inlet first conduit 16 and the lower outlet second conduit 20. Replacing the primary wearing part, the elongated o-ring 38, on the prior art drain strainer assembly 30, requires tooling to remove the housing 32 and involves substantial downtime on the aircraft or other vehicle. The drain strainer assembly 100 advantageously increases maintenance efficiency, and reduces overall operational costs.

Furthermore, the drain strainer assembly 100 improves the efficiency of routine maintenance operations. Because the strainer member assembly 130 may be accessed and withdrawn directly from the front of the drain strainer assembly 100, crew members and other personnel are no longer required to access it from the side, which can be awkward and difficult while working in the limited space typically available in the galley 10.

Another advantage of the drain strainer assembly 100 is that space within the vehicle may be more effectively utilized. Because the strainer member assembly 130 may be withdrawn directly from the front of the drain strainer assembly 100, there is no need to reserve an area on the support wall 18 to accommodate the extraction envelope of the prior art drain strainer assembly 30. As a result, this area is available for use by other components or other structures, advantageously providing increased flexibility for the design of the vehicle.

Another advantage of the drain strainer assembly 100 is that, due to its front access configuration, the drain strainer assembly 100 comprises a single part number, unlike the prior art drain strainer assembly 30, which is available in separate right-hand and left-hand part numbers, to facilitate the side extraction envelope. The single part number is a substantial advantage over the prior art drain strainer assembly 30, reducing the variability of parts for the aircraft or other vehicle, and improves the cost of developing, certifying, manufacturing and stocking a single part number.

Although the drain strainer assembly 100 has been described primarily in the context of a galley 10 in a commercial passenger aircraft, those of ordinary skill in the art will appreciate that the drain strainer assembly 100 can be implemented in a wide variety of other vehicles, such as trains, ships, buses, etc. In addition, the drain strainer assembly 100 can be implemented in other settings, such as commercial kitchens or restrooms, in which a user desires to strain debris and particulate matter from waste fluids flowing through a conduit.

Another advantage of the drain strainer assembly 100 is its improvement in ease of access for proper cleaning and inspection of both the strainer member assembly 130 and the housing 105. Both components offer easy internal access by fingers to all areas to facilitate the complete removal of residue by normal cleaning methods. Smooth seamless internal surfaces and radius corners (FDA Sanitary Construction) with large circular openings eliminate corners where odor causing bacteria, mold, etc. can accumulate. This is a substantial advantage over the prior art drain strainer assembly 30, which has numerous sharp corners and deep, narrow openings that are difficult to access, hindering proper cleaning and inspection. The drain strainer assembly 100 advantageously increases cleaning efficiency, therefore reducing time to clean and removing residue and the resulting drain odors.

Although this disclosure has been described in terms of certain preferred configurations, other configurations that are apparent to those of ordinary skill in the art, including configurations that do not provide all of the features and advantages set forth herein, are also within the scope of this disclosure. Accordingly, the scope of the present disclosure is defined only by reference to the appended claims and equivalents thereof.

What is claimed is:
1. A drain strainer assembly comprising:
   a housing having a circular cross-section, the housing comprising an inlet port, an outlet port, and a plurality of first engagement tabs; and
   a strainer member assembly having a circular cross-section, the strainer member assembly comprising:
      a strainer member with a solid front surface having a handle and a plurality of second engagement tabs interlocked with the first engagement tabs on the housing, the strainer member further comprising cylindrical strainer sidewalls defining a circular opening at a back of the strainer member and having an upper conduit aligned with the inlet port of the housing; and
      a circular strainer disk coupled to the strainer member with a fastener and covering the circular opening at the back of the strainer member,
   wherein the handle is an elongated handle that extends beyond the circular cross-section of the strainer member assembly and the plurality of second engagement tabs are located on the handle, wherein the second engagement tabs being positioned outside of the first engagement tabs and the handle is aligned with the inlet port when the second engagement tabs are interlocked with the first engagement tabs.

2. The drain strainer assembly of claim 1, wherein the housing comprises a plurality of primary mounting holes through which fasteners may be inserted to secure the housing to a structure.

3. The drain strainer assembly of claim 2, wherein the housing further comprises an optional secondary mounting hole.

4. The drain strainer assembly of claim 3, wherein the primary mounting holes and secondary mounting holes are configured to enable a retrofit installation of the drain strainer assembly.

5. The drain strainer assembly of claim 1, wherein the strainer member assembly further comprises a sealing member.

6. The drain strainer assembly of claim 5, wherein the sealing member comprises a circular o-ring located within a corresponding groove in the cylindrical strainer sidewalls of the strainer member.

7. The drain strainer assembly of claim 1, further comprising a label on the handle of the strainer member, the label indicating the correct orientation of the strainer member assembly within the housing.

8. The drain strainer assembly of claim 1, wherein the fastener comprises an attachment pin or a hinge mechanism.

9. A vehicle galley comprising a counter surface having a catch basin disposed therein, the catch basin being fluidly coupled to a first conduit attached to a support wall, a circular drain strainer assembly attached to the support wall, and a second conduit attached to the support wall, the circular drain strainer assembly comprising:
 a housing having a circular cross-section, the housing comprising an inlet port fluidly coupled to the first conduit, an outlet port fluidly coupled to the second conduit, and a plurality of first engagement tabs; and
 a strainer member assembly having a circular cross-section, the strainer member assembly comprising:
  a strainer member with a solid front surface having handle and a plurality of second engagement tabs interlocked with the first engagement tabs on the housing, the strainer member further comprising cylindrical strainer sidewalls defining a circular opening at a back of the strainer member and having an upper conduit aligned with the inlet port of the housing; and
  a circular strainer disk coupled to the strainer member with a fastener and covering the circular opening at the back of the strainer member,
 wherein the handle is an elongated handle that extends beyond the circular cross-section of the strainer member assembly and the plurality of second engagement tabs are located on the handle, wherein the second engagement tabs being positioned outside of the first engagement tabs and the handle is aligned with the inlet port when the second engagement tabs are interlocked with the first engagement tabs.

10. The vehicle galley of claim 9, wherein the vehicle comprises an aircraft, a train, or a ship.

11. The vehicle galley of claim 9, wherein the strainer member assembly further comprises a sealing member.

12. The vehicle galley of claim 11, wherein the sealing member comprises a circular o-ring located within a corresponding groove in the cylindrical strainer sidewalls of the strainer member.

13. The vehicle galley of claim 9, wherein the fastener comprises an attachment pin or a hinge mechanism.

14. A method of removing debris from a drain strainer assembly having a circular housing and a circular strainer member assembly, the method comprising:
 rotating a handle of the strainer member assembly to disengage a first plurality of engagement tabs on the strainer member assembly from a second plurality of complementary engagement tabs on the housing;
 removing the strainer member assembly from an opening in a front of the housing, the strainer member further comprising cylindrical strainer sidewalls defining a circular opening at a back of the strainer member and having an upper conduit aligned with the inlet port of the housing;
 moving a strainer disk from the back of the strainer member assembly to reveal the circular opening at the back of the strainer member assembly;
 discarding debris through the circular opening at the back of the strainer member assembly; and
 inserting the strainer member assembly into the opening in the front of the housing and securing the strainer member assembly in the housing by rotating the handle of the strainer member assembly, wherein the handle is an elongated handle that extends beyond a circular cross-section of the strainer member assembly and securing the strainer assembly further comprising rotating the elongated handle until the first engagement tabs are engaged with the second engagement tabs and the elongated handle is aligned with an inlet port of the housing.

15. The method of claim 14, further comprising washing and rinsing the strainer member assembly.

16. The method of claim 14, wherein moving the strainer disk comprises: (a) rotating the strainer disk around an attachment pin, or (b) opening a hinge mechanism.

* * * * *